United States Patent [19]

Kobayashi et al.

[11] Patent Number: 4,677,373
[45] Date of Patent: Jun. 30, 1987

[54] SENSOR FOR DETECTING LEAKS OF CORROSIVE LIQUID

[75] Inventors: Satoru Kobayashi; Satoshi Tanaka, both of Hitaka, Japan

[73] Assignee: Junkosha Co., Ltd., Tokyo, Japan

[21] Appl. No.: 884,726

[22] Filed: Jul. 11, 1986

[30] Foreign Application Priority Data

Jul. 18, 1985 [JP] Japan ............................. 60-157053

[51] Int. Cl.⁴ .................... G01R 27/02; G01M 3/04
[52] U.S. Cl.⁴ ................... 324/65 LR; 340/605; 73/40
[58] Field of Search ............... 73/40.5 R, 40, 49.1; 324/51, 52, 65 LR, 65 R, 71.2; 174/11 R; 340/603, 605

[56] References Cited

U.S. PATENT DOCUMENTS

| | | | |
|---|---|---|---|
| 3,564,526 | 2/1971 | Butts | 340/605 |
| 4,041,771 | 8/1977 | Allan et al. | 73/40.5 R |
| 4,206,632 | 6/1980 | Suzuki | 340/605 |

FOREIGN PATENT DOCUMENTS

| | | | |
|---|---|---|---|
| 0104017 | 8/1979 | Japan | 73/40 |
| 0066336 | 4/1982 | Japan | 73/40 |
| 0612102 | 6/1978 | U.S.S.R. | 73/40.5 R |

*Primary Examiner*—Stewart J. Levy
*Assistant Examiner*—Robert R. Raevis
*Attorney, Agent, or Firm*—Mortenson & Uebler

[57] ABSTRACT

A sensor for detecting leaks of a corrosive liquid is provided comprising a pair of plate electrodes made of a conductive metal which is corroded by the liquid to be detected spaced apart and separated by an inner sheet of an electrically insulating material, the inner sheet having a plurality of through-holes, this entire construction being sealingly encased between a pair of outer insulating sheets, at least one of which has a plurality of through-holes. In use, if a leak occurs the liquid passes through the through-holes in the outer insulating sheet, dissolves a portion of one electrode and passes through the through-holes in the inner sheet to the second electrode, causing a short circuit resulting in a rapid and accurately measurable decrease in the resistance in the circuit and, therefore, detection of the leak.

3 Claims, 6 Drawing Figures

SENSOR FOR DETECTING LEAKS OF CORROSIVE LIQUID

BACKGROUND OF THE INVENTION

The present invention relates to a sensor for detecting leaks of a corrosive liquid.

When a corrosive liquid such as hydrochloric acid leaks from a storage tank in an industrial plant or the like, extensive environmental pollution may occur. It is therefore essential for such leakage to be detected at an early stage. To meet this need, a corrosive liquid sensor as shown in FIGS. 3(A) and (B) has been proposed previously. FIG. 3(A) is a schematic cross-sectional view of the sensor, showing it in an exploded manner. FIG. 3(B) is a fragmentary top plan view of the sensor. This sensor includes a pair of insulating films 1a and 1b and a pair of metal wires, i.e., electrodes 2a and 2b. The insulating films 1a and 1b are formed from an insulating material such as Teflon ® polytetrafluoroethylene which is not corroded by the corrosive liquid to be detected. The electrodes 2a and 2b are made of a metal such as aluminum which will be corroded by the corrosive liquid, and have a circular cross-section. The electrodes 2a and 2b are disposed between the insulating films 1a and 1b parallel to each other, and the insulating films 1a and 1b are placed on top of one another with the electrodes placed therebetween and are bonded together to form the sensor. In FIG. 3(A), these components are shown in an exploded manner, as described above, for convenience of illustration. As seen from FIG. 3(B), one of the insulating films 1a is provided with a large number of through-holes 4a and 4b which are aligned in two rows 3a and 3b extending along the electrodes 2a and 2b and are spaced apart from one another at predetermined intervals along each row, such that the electrodes 2a and 2b are exposed through these through-holes.

To detect the leakage of a corrosive liquid, this sensor is placed at a site where leakage may be expected, and the electrodes 2a and 2b which respectively act as electrodes are connected to a detecting circuit (not shown). If leakage occurs, the corrosive liquid which has leaked passes through at least a part of the through-holes 4a and 4b and enters the inside of the sensor. The detecting circuit is opened when at least one of the electrodes 2a and 2b are dissolved, thereby detecting the leakage of the corrosive liquid.

In this type of sensor, the metal wires 2a and 2b which serve as the electrodes generally have a diameter as small as about 0.6 mm, i.e., they present a small surface area to be melted by the corrosive liquid. Therefore, it takes a relatively long time for the electrode to be dissolved. In addition, even if the electrode is fused, both electrodes may be shorted due to the presence of the corrosive liquid. Because the natural resistance of the corrosive liquid is low, the circuit may not be completely opened, making accurate detection of the leakage difficult. FIG. 4 shows how the resistance detected in the above-described detecting circuit changes as the time passes when samples 1 and 2, which are provided by suitably dividing the sensor of FIGS. 3(A) and (B) into two halves longitudinally, are soaked in about 100 cc of hydrochloric acid having a concentration of 36 weight percent. As seen from the figure, the resistance, which was 10 ohms before the samples were immersed, only become about 70 ohms after 100 minutes of immersion. It is therefore clear that it is difficult for the sensor shown in FIGS. 3(A) and (B) to quickly and accurately detect leakages.

Accordingly, an object of the present invention is to provide a sensor for detecting leaks of a corrosive liquid which can solve the problems of the prior art by quickly and accurately detecting leakages of a corrosive liquid.

SUMMARY OF THE INVENTION

A sensor for detecting leaks of a corrosive liquid is provided comprising a pair of plate electrodes connected in a circuit to resistance measuring means, the electrodes being made of an electrically conductive metal which is corroded by the liquid to be detected, the electrodes spaced apart and separated from each other by an inner sheet of an electrically insulating material which is inert to the liquid to be detected, this inner sheet having a plurality of through-holes, the aforesaid construction being sealingly encased between a pair of outer insulating sheets both of which are inert to the liquid to be detected, at least one of which outer sheets has a plurality of through-holes, whereby, in use, if a leak occurs adjacent the sensor, the liquid passes through the through-holes in the outer insulating sheet, dissolves a portion of one electrode and passes through the through-holes in the inner sheet to the second electrode causing a short circuit, thereby resulting in a rapid and accurately measurable decrease in the resistance in the circuit and, therefore, detection of the leak. The plate electrodes are preferably aluminum foils and the inner and outer sheets of insulating material are preferably films of polytetrafluoroethylene.

DETAILED DESCRIPTION OF THE INVENTION AND PREFERRED EMBODIMENTS WITH REFERENCE TO THE DRAWINGS

A sensor for detecting leaks of a corrosive liquid is provided comprising a pair of plate electrodes made of a conductive metal which is corroded by the liquid to be detected spaced apart and separated by an inner sheet of an electrically insulating material, the inner sheet having a plurality of through-holes, this entire construction being sealingly encased between a pair of outer insulating sheets, at least one of which has a plurality of through-holes. In use, if a leak occurs the liquid passes through the through-holes in the outer insulating sheet, dissolves a portion of one electrode and passes through the through-holes in the inner sheet to the second electrode, causing a short circuit resulting in a rapid and accurately measurable decrease in the resistance in the circuit and, therefore, detection of the leak.

The sensor for detecting a leak of a corrosive liquid according to the invention comprises an intermediate insulating film having a plurality of through-holes, a pair of flat electrodes, one electrode disposed on either side of the insulating film, and a pair of external insulating films, either or both of the external insulating films having a large number of through-holes formed over substantially the entire surface thereof, wherein the flat electrodes and the intermediate insulating film are sealingly covered by the external insulating films with the intermediate insulating film disposed between the flat electrodes, and the external insulating films are sealed to each other.

Because the sensor according to the present invention employs film-like or foil-like flat electrodes as the electrode to be melted by the corrosive liquid, if the corrosive liquid leaks, both electrodes are shorted through the corrosive liquid only by the formation of an opening on a part of the electrode by corrosion, and the leaked liquid can thereby be detected. As a consequence, rapid detection is possible. In this detection method based on the short between the electrodes, it is possible to obtain great changes in resistance after and before the short, thereby ensuring rapid and accurate detection.

One embodiment of the present invention will be described hereinunder with reference to the accompanying drawings.

Figure 1A:
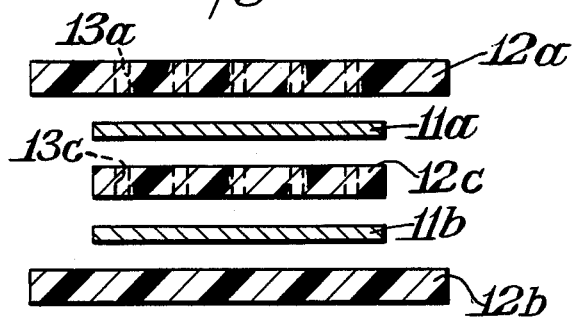
FIG. 1(A) is a schematic cross-sectional view of an embodiment of a corrosive-liquid-detecting-sensor according to the present invention, showing it in an exploded and enlarged manner, for the convenience of the illustration.
Figure 3A:
FIG. 3(A) is a schematic cross-sectional view showing an example of a previously known corrosive-liquid-detecting-sensor in an exploded and enlarged manner as shown in FIG. 1(A).
Figure 1B:
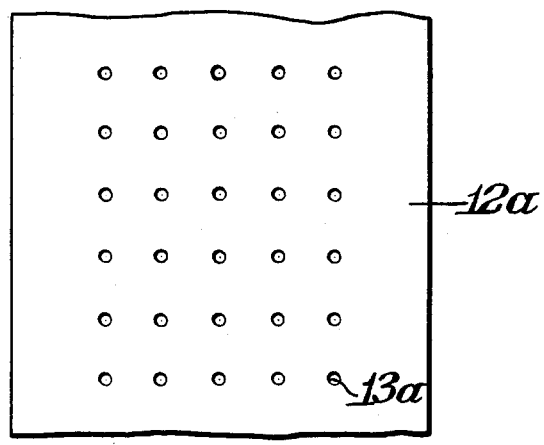
FIG. 1(B) is a fragmentary top plan view of the sensor.
Figure 3B:
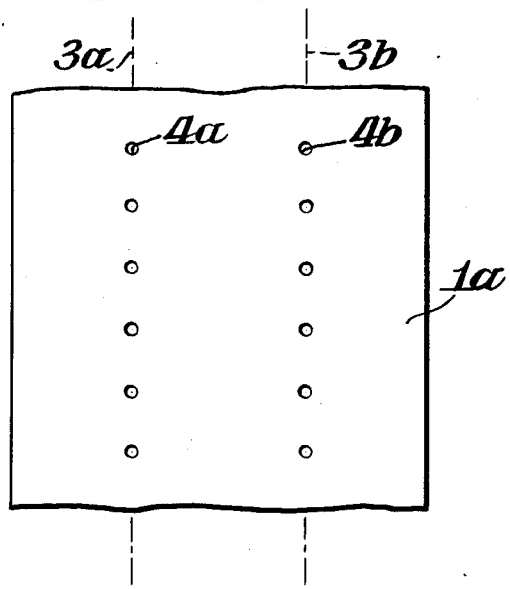
FIG. 3(B) is a fragmentary top plan view of the example shown in FIG. 3(A).

FIG. 1(A) is a schematic cross-sectional view of an embodiment of a corrosive liquid detecting sensor according to the present invention, showing it in an exploded and enlarged manner. FIG. 1(B) is a fragmentary top plan view of the sensor.

The sensor has a pair of flat electrodes 11a and 11b made of, for example, a sheet of aluminum having a thickness of 0.1 mm, and an intermediate insulating film 12c made of, for example, Teflon ® polytetrafluoroethylene disposed between the flat electrodes. The intermediate insulating film 12c is provided with a plurality of through-holes 13c for a purpose to be described later. The pair of electrodes 11a and 11b and the intermediate insulating film 12c arranged in this manner are then covered with a pair of external insulating films 12a and 12b formed of polytetrafluoroethylene, as is the intermediate insulating film 12c, and the external insulating films 12a and 12b are bonded or melted together to seal the construction. As described above, these elements are shown in an exploded manner in FIG. 1(A). The external insulating film 12a is provided with a large number of through-holes 13a formed over substantially the entire surface thereof, as shown in FIG. 1(B), so that these through-holes 13a, together with the through-holes 13c formed on the intermediate insulating film 12c, constitute passages for the corrosive liquid to be detected. In this case, the flat electrode 11a is exposed through a large number of through-holes 13a formed in the external insulating film 12a.

In actual operation, the sensor is placed at a site where the leakage of a corrosive liquid is expected, and is electrically connected to a suitable detecting circuit (not shown) in which the electrodes 11a and 11b act as its elements. When leakage of the corrosive liquid occurs, the leaked liquid passes through at least a part of the through-holes 13a in the external insulating film 12a and enters the inside of the sensor, creating an opening in the flat electrode 11a which is exposed through these through-holes 13a. The liquid then passes through the through-holes 13c in the intermediate insulating film 12c and reaches the other flat electrode 11b. In this case, the flat electrode 11b serves as a receptacle for the corrosive liquid. In consequence, the electrodes 11a and 11b are shorted through the liquid detected, and the leakage of the corrosive liquid can be detected by observing in this detecting circuit the changes in resistance caused by this short or the changes in capacitance or impedance before and after the short.

As will be understood from the foregoing description, in this invention a sheet-like flat electrode of, for example, about 0.1 mm thickness is melted such that an opening is formed therein. Therefore, it takes less time for the electrode to be melted compared to the conventional sensor in which a metal wire having a circular cross-section is dissolved. In the known sensor described above in which the circuit is made to open when the metal wire is dissolved, it is difficult to precisely detect the opening of the circuit because the circuit is shorted by the corrosive liquid. On the other hand, the sensor of this invention detects the leakage by creating an opening on one electrode and then detecting the changes in capacitance or impedance caused by the presence of the leaked liquid between the two electrodes or by shorting the circuit through the liquid and then detecting the changes in resistance in the detecting circuit caused by the short. Thus, rapid and accurate detection is possible.

Figure 2:
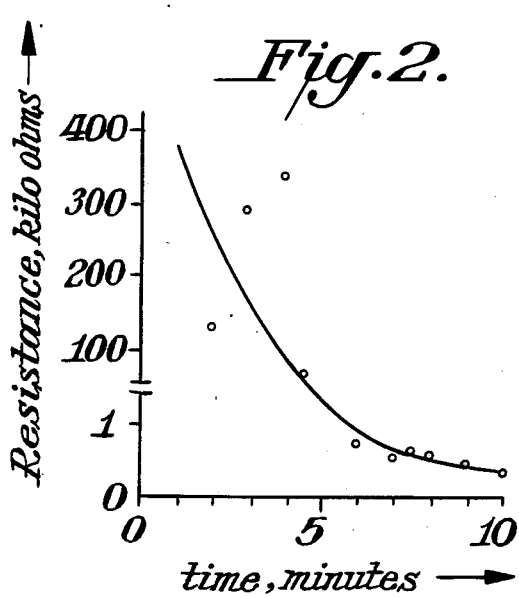
FIG. 2 is a graph showing measured resistance versus time using the sensor of this invention.
Figure 4:
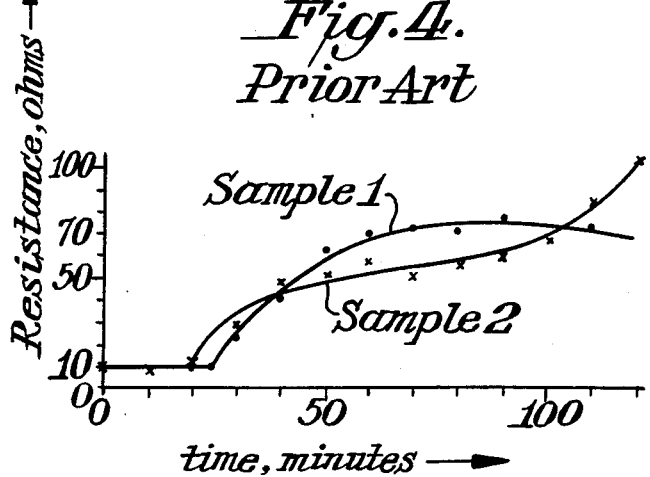
FIG. 4 is a graph showing measured resistance versus time using the known sensor of FIGS. 3(A) and 3(B).

FIG. 2 shows how the resistance in the detecting circuit changes as time passes when the sensor of this invention shown in FIG. 1 is soaked in about 100 cc of hydrochloric acid having a concentration of 36 weight percent. As seen from the figure, the initial infinite resistance is changed to 1 ohms or less after only 6 minutes of immersion. Thus, in the present invention, it is possible to obtain great changes in resistance in a short time, because the sensor of this invention employs the external insulating films provided with the through-holes formed evenly over the entire surface thereof as well as the sheet-like or foil-like flat electrodes which can be quickly and surely melted by the corrosive liquid.

In the above-described embodiment, the electrodes are formed from aluminum. Any other suitable metals, however, may be used, so long as the metal chosen can be easily melted by the corrosive liquid to be detected.

Each insulating film in the above-described embodiment is formed of polytetrafluoroethylene. However, the film is not limited to this material, and any other suitable insulating material may be used so long as it is one which is not dissolved by the corrosive liquid to be detected.

In the above embodiment, one of the insulating films 12a and 12b is provided with through-holes. However, the through-holes may be formed in both films. It is also clear that these through-holes may be formed in a pattern other than that shown in FIG. 1(B).

While the invention has been disclosed herein in connection with certain embodiments and detailed descriptions, it will clear to one skilled in the art that modifications or variations of such details can be made without deviating from the gist of this invention, and such modifications or variations are considered to be within the scope of the claims hereinbelow.

What is claimed is:

1. A sensor for detecting leaks of a corrosive liquid being a construction comprising a pair of plate electrodes connected in a circuit to resistance measuring means, said electrodes being made of an electrically conductive metal which is corroded by the liquid to be detected, said electrodes spaced apart and separated from each other by an inner sheet of an electrically insulating material which is inert to the liquid to be detected, said inner sheet having a plurality of through-holes, the aforesaid construction being sealingly encased between a pair of outer insulating sheets both of which are inert to the liquid to be detected, at least one of which outer sheets has a plurality of through-holes, whereby, in use, if a leak occurs adjacent said sensor, the liquid passes through the through-holes in the outer insulating sheet, dissolves a portion of one electrode and passes through the through-holes in the inner sheet to the second electrode causing a short circuit, thereby resulting in a rapid and accurately measurable decrease in the resistance in the circuit and, therefore, detection of the leak.

2. The sensor of claim 1 wherein said plate electrodes are aluminum foils.

3. The sensor of claim 1 wherein said inner and outer sheets of insulating material are films of polytetrafluoroethylene.

* * * * *